(12) United States Patent
Holland et al.

(10) Patent No.: US 8,752,641 B2
(45) Date of Patent: Jun. 17, 2014

(54) TORQUE PROTECTION DEVICE FOR FIRE BLANKET AND ASSOCIATED METHOD

(75) Inventors: Brian Kenneth Holland, Lansing, MI (US); William Bogue, Hebron, CT (US); Daniel M. Stadtlander, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 393 days.

(21) Appl. No.: 13/242,564

(22) Filed: Sep. 23, 2011

(65) Prior Publication Data

US 2012/0132447 A1    May 31, 2012

Related U.S. Application Data

(60) Provisional application No. 61/417,971, filed on Nov. 30, 2010.

(51) Int. Cl.
*A62C 8/00* (2006.01)

(52) U.S. Cl.
USPC .............................................. 169/48; 169/49

(58) Field of Classification Search
CPC ............... A62C 2/06; A62C 2/10; A62C 2/12
USPC .................... 169/48, 49, 43, 64, 65
See application file for complete search history.

(56) References Cited

U.S. PATENT DOCUMENTS

| | | | |
|---|---|---|---|
| 3,197,854 A | 8/1965 | Rohe et al. | |
| 5,654,060 A | 8/1997 | Holman et al. | |
| 6,659,698 B2 | 12/2003 | Kirchen et al. | |
| 7,584,582 B1 | 9/2009 | Hutter, III | |
| 7,596,949 B2 | 10/2009 | DeVane et al. | |
| 7,607,488 B2 * | 10/2009 | Durham | 169/46 |
| 7,650,678 B2 | 1/2010 | Bogue | |
| 7,695,585 B2 | 4/2010 | Bogue et al. | |
| 7,735,539 B2 * | 6/2010 | Nakamura et al. | 160/243 |
| 2010/0115965 A1 | 5/2010 | Farah et al. | |

\* cited by examiner

*Primary Examiner* — Davis Hwu
(74) *Attorney, Agent, or Firm* — Kinney & Lange, P.A.

(57) ABSTRACT

A fire blanket assembly includes a thermal insulation material defining an opening, a metallic foil layer positioned along a first surface of the thermal insulation material and over at least a portion of the opening, an insert disc positioned adjacent to a second surface of the thermal insulation material opposite the first surface and further being positioned at the opening in the thermal insulation material, and a detail. The detail includes a base positioned at least partially within the opening in the thermal insulation material, a sidewall extending from the base, and a flange extending from the sidewall at a location spaced from the base, a perimeter of the flange turned at least partially away from the metallic foil layer.

20 Claims, 4 Drawing Sheets

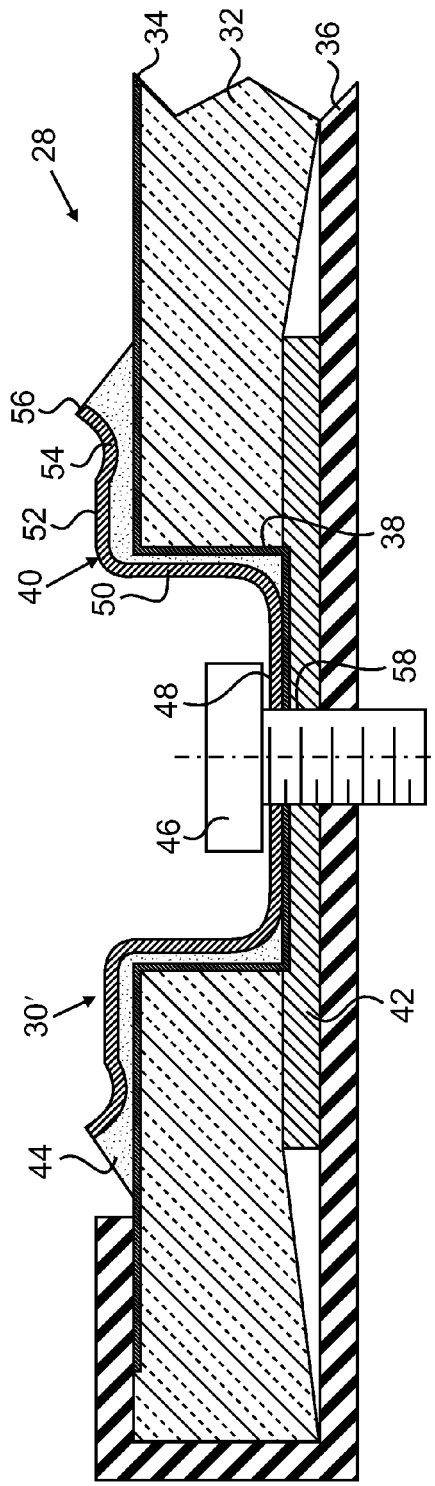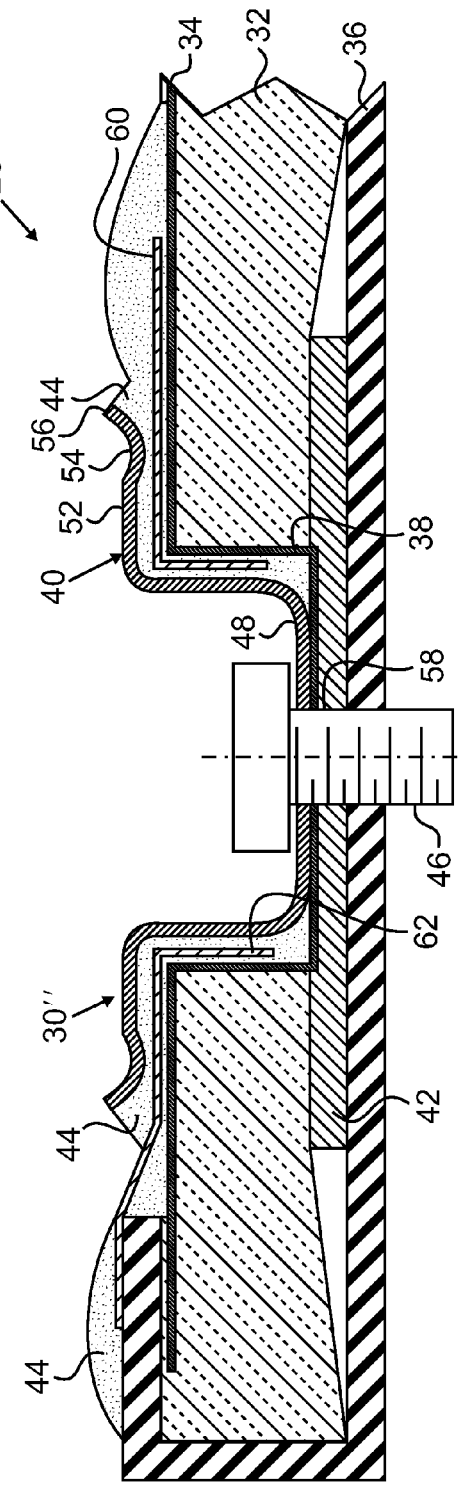

TORQUE PROTECTION DEVICE FOR FIRE BLANKET AND ASSOCIATED METHOD

CROSS-REFERENCE TO RELATED APPLICATION(S)

This application claims priority to U.S. Provisional Patent App. Ser. No. 61/417,971, filed Nov. 30, 2010, which is hereby incorporated by reference in its entirety.

BACKGROUND

The present invention relates to devices for use with fire blankets and methods for assembly fire blanket assemblies.

Fire (or thermal) blankets can be used to provide thermal and/or fire protection in desired areas. For example, fire blankets are commonly used in thrust reverser and outer cowling assemblies of aircraft, in locations are may be exposed to relatively high temperatures. Such fire blankets can consist of a quilted ceramic cloth with ceramic batting, and an outer foil layer. A rubber backing is sometimes also provided on a surface opposite the foil layer. These blankets are secured to a desired installation location using bolts that extend through openings in the blanket. However, the fire blanket, particularly the foil layer, can be damaged through cracking, tearing, etc. Damage is particularly common at or near the bolt holes, where torque transmitted from the bolt, foil flexure (particularly hinge-like flexure about a bolt or other attachment), and high temperatures can cause foil damage. Such damage has in the past required that a damaged fire blanket be discarded and replaced with a new blanket. However, the cost of a fire blanket can be substantial.

SUMMARY

A fire blanket assembly according to the present invention includes a thermal insulation material defining an opening, a metallic foil layer positioned along a first surface of the thermal insulation material and over at least a portion of the opening, an insert disc positioned adjacent to a second surface of the thermal insulation material opposite the first surface and further being positioned at the opening in the thermal insulation material, and a detail. The detail includes a base positioned at least partially within the opening in the thermal insulation material, a sidewall extending from the base, and a flange extending from the sidewall at a location spaced from the base, a perimeter of the flange turned at least partially away from the metallic foil layer.

BRIEF DESCRIPTION OF THE DRAWINGS

FIG. 3A is a cross-sectional view of one embodiment of an attachment subassembly of the fire blanket assembly, taken along line 3A-3A of FIG. 2.

FIG. 3B is a cross-sectional view of another embodiment of an attachment subassembly of the fire blanket assembly, taken along line 3B-3B of FIG. 2.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. Like reference numbers have been used to designate like parts throughout the figures. The figures may not be drawn to scale.

DETAILED DESCRIPTION

Figure 1:
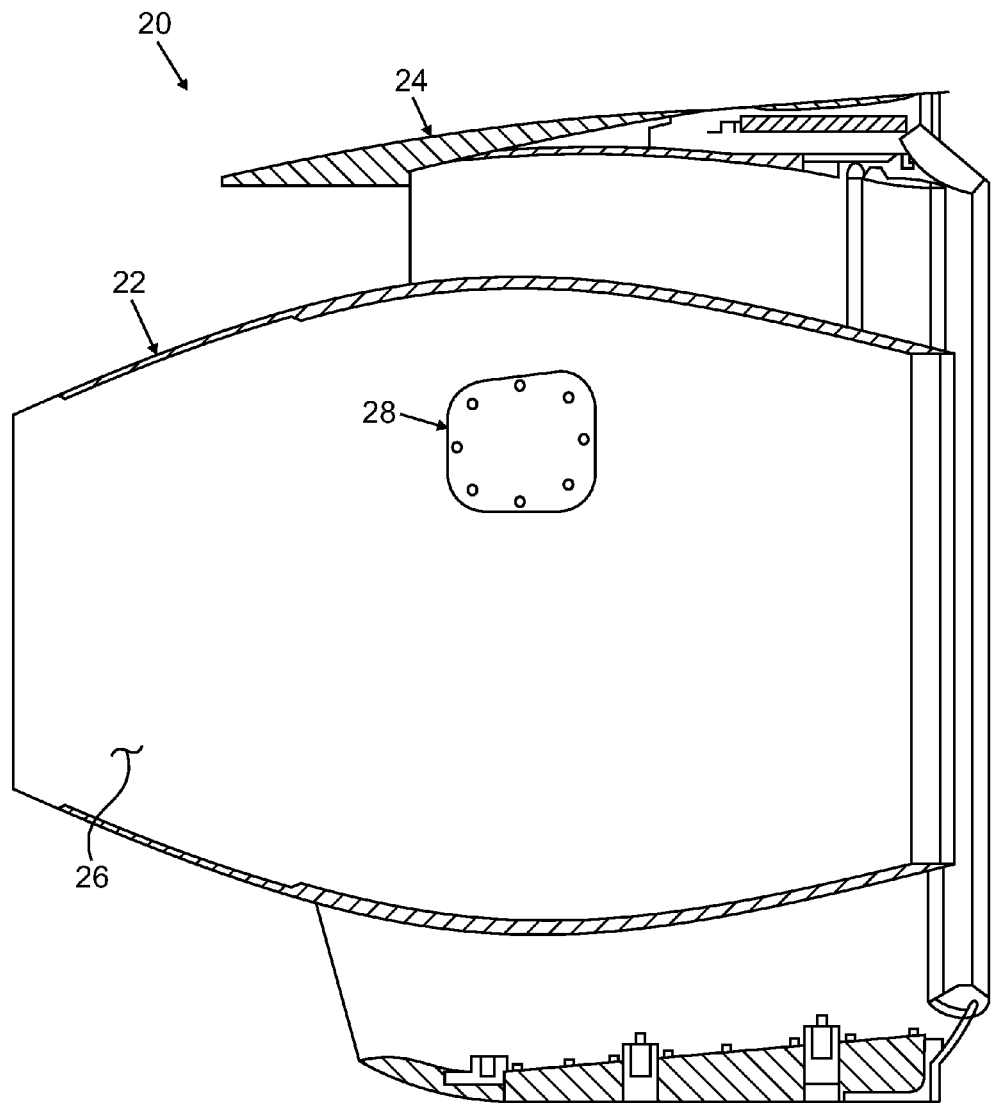
FIG. 1 is a cross-sectional view of a portion of an engine cowling assembly.

FIG. 1 is a cross-sectional view of part of an engine cowling known as a thrust reverser assembly 20, which is suitable for use on an aircraft in conjunction with a gas turbine engine (not shown). As shown in FIG. 1, the assembly 20 includes a structure 22 and a thrust reversal actuation subassembly 24. A gas turbine engine (not shown) can be positioned such that hot fluids are present along the structure 22. The structure 22 in the illustrated embodiment has a toroidal and pseudo-cylindrical shape, and can be supported by an aircraft's airframe (not shown). A convergent shape created between the structure 22 and the thrust reverser actuation subassembly 24 creates a nozzle effect that is capable of producing thrust. Often the material of the structure 22 has thermal limits, and is shielded or insulated from hot fluids to help prevent thermal damage. The thrust reversal actuation assembly 24 allows for reversal of thrust-producing fluids from the gas turbine engine, and can have a conventional configuration of a type known in the art. It should be noted that the assembly 20 is shown merely by way of example and not limitation. The present invention can be used in conjunction with a variety of assemblies of different configurations.

A thermal insulation coating 26 can be provided along an interior (i.e., radially inward) surface of the structure 22, or at other locations as desired for particular embodiments. Furthermore, one or more fire blanket assemblies 28 (synonymously called thermal blanket assemblies or fire shield assemblies) are provided along the interior surface of the structure 22 at desired locations. The shape and size of each thermal blanket assembly 28 can vary as desired. Often a fire blanket assembly 28 is provided in a location where the thermal insulation coating 26 is absent or would not be practical, such as at a location where a removable access panel (not shown) is located along the structure 22.

Figure 2:
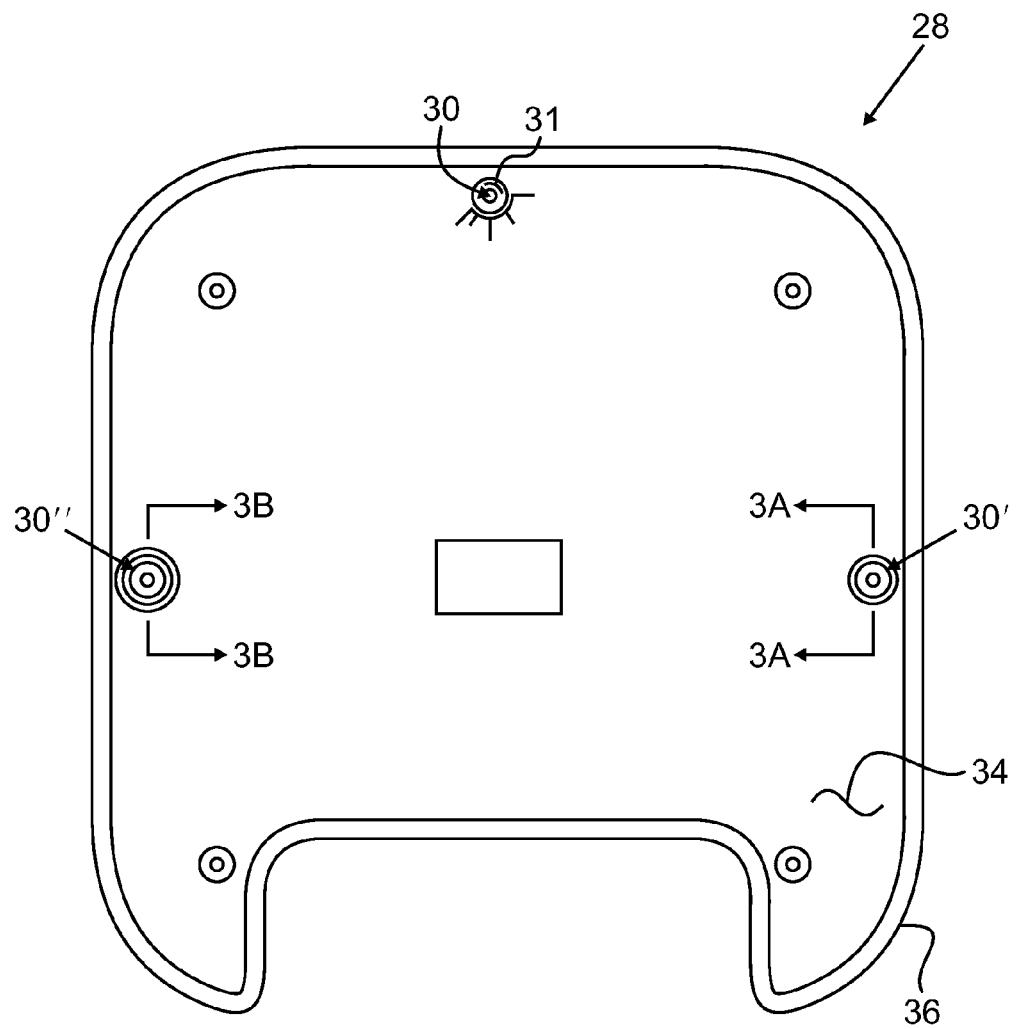
FIG. 2 is a top view of a fire blanket assembly according to the present invention.

FIG. 2 is a top view of one embodiment of the fire blanket assembly 28. The assembly 28 includes a number of attachment subassemblies 30, 30', 30" for attaching the fire blanket assembly 28 to a desired location using suitable removable fasteners. As shown in FIG. 2, damage 31 is present in the fire blanket assembly 28 at one of the attachment subassemblies 30, which can be a prior art subassembly. The damage 31 includes cracks or tearing of a metallic foil layer of the fire blanket assembly 28, which can be caused by a variety of factors. For example, installation, removal or other operations can damage the foil layer, particularly torque from tightening or loosening a fastener. Furthermore, operational conditions can induce the damage 31.

FIG. 3A is a cross-sectional view of a portion of the fire blanket assembly 28, showing one embodiment of an attachment subassembly 30', along line 3A-3A of FIG. 2. As shown in FIG. 3A, the fire blanket assembly 28 includes a thermal insulation material 32, a metallic foil layer 34 positioned along a first surface of the thermal insulation material 32, and a rubber backing 36 that extends along a second surface of the thermal insulation material 32 opposite the first surface and around perimeter edges of the fire blanket assembly 28. The rubber backing 36 is optional, and may not be present with some fire blanket assemblies in further embodiments. The rubber backing 36 (and the second surface of the thermal insulation material 32) is arranged to face a component on which the fire blanket assembly 28 is mounted. The thermal insulation material 32 can be a ceramic fabric with ceramic batting. An opening (or depression) 38 is present in the thermal insulation material 32 to accommodate the attachment subassembly 30'. The foil layer 34 extends into and across the opening 38. The foil layer 34 can be adhered to the thermal insulation material 32 with a suitable adhesive. In some embodiments, the foil layer 34 is texturized or rigidized. The foil layer 34 can be made of stainless steel, or other suitable materials.

The attachment subassembly 30' includes a detail 40, an insert disc 42, sealant 44, and a fastener 46 (e.g., bolt, screw, rivet, etc.). The detail 40 and sealant 44 are not part of the prior art subassembly 30. The insert disc 42 is positioned along the second surface of the thermal insulation material 32, substantially aligned with the opening 38, and in between the foil layer 34 and the rubber backing 36. The insert disc 42 can be a substantially planar metallic element (e.g., made of stainless steel) that provides a relatively stiff and rigid structure to help support the fastener 46.

The detail 40 of the illustrated embodiment includes a substantially planar, disc shaped base 48, a substantially cylindrical sidewall 50 extending from a perimeter of the base 48, and a substantially annular flange 52 extending from an end of the sidewall 50 opposite the base 48. A perimeter portion (or lip) 54 of the flange 52 can have a toroidal shape, with a perimeter edge 56 that is upturned to at least partially face away from the base 48, and to thereby also face away from the foil layer 34. The detail 40 is positioned partially within the opening in the thermal insulation material 32, such that at least portions of the base 48 and the sidewall 50 are within the opening 38. A lateral gap can be present between the sidewall 50 and the thermal insulation material 32 to allow for the presence of the sealant 44, described below. When installed, the base 48 of the detail 40 can rest directly against the foil layer 34 within the opening 38. The detail 40 can be made of a metallic material, such as 300 series stainless steel. In one embodiment, the detail 40 is made from a material that is substantially identical to that of the metallic foil layer 34, which can help reduce or eliminate galvanic corrosion. The detail can be made using stamping.

The sealant 44 can be of a type that provides a firewall bypass even under charred conditions. In one embodiment, the sealant 44 can be an addition-cured silicone sealant. An addition-cured sealant allows for curing independent of ambient humidity as required with condensation-cured sealants, which allows for more reliable curing given the relatively large area of coverage of the sealant 44 with limited exterior exposure of the sealant 44. As shown in the illustrated embodiment, the sealant is positioned between the sidewall 50 and the flange 52 of the detail and the foil layer 34. The sealant 44 provides adhesive bonding as well as fluidic and firewall sealing. The sealant 44 can be omitted from the area between the base of the detail 40 and the foil layer 34 in the area of the opening 38. Furthermore, an edge seal can be formed with the sealant 44 at the edge 56 of the flange 52 of the detail 40.

A hole 58 is defined through the subassembly 30'. More particularly, corresponding holes 58 that are aligned to accept the fastener 46 are defined through each of the base 48 of the detail 40, the foil layer 34, the insert disc 42 and the rubber backing 36.

The detail 40 can be used to cover damage to the foil layer 34, like the damage 31 shown in FIG. 2, and can help prevent exposure of the thermal insulation material 32 to a potentially hot ambient environment. The detail 40 further can be a relatively stiff and rigid structure that can be withstand torque transmitted by the fastener 46.

FIG. 3B is a cross-sectional view of another embodiment of an attachment subassembly 30" of the fire blanket assembly 28, shown along line 3B-3B of FIG. 2. The attachment subassembly 30" is generally similar to the subassembly 30' described above. However, the subassembly 30" further includes a foil patch 60. The foil patch 60 can be positioned at or near the opening 38 in the thermal insulation material 32. The foil patch 60 can be used to cover damage (e.g., like the damage 31 shown in FIG. 2) to the foil layer 34 that is larger than the detail 40. In general, the foil patch 60 can be custom shaped to a desired shape and size, for example, a generally circular shape. Corners of the foil patch 60 should be rounded. A central opening 62 can be formed in the foil patch 62, and the patch 60 positioned to extend into the opening 38 in the thermal insulation 32 and extending over the foil layer 34. The central opening 62 of the patch 60 can be aligned such that the patch 60 does not cover an area of the foil layer 34 within the opening 38 along the insert disc 42. The sealant 44 can be used along an entire backside of the patch 60 where the patch 60 is adhered to the foil layer 34. An edge seal can be formed with the sealant 44 along a perimeter edge of the patch 60. The detail 40 can then be positioned over the patch 60, with the sealant 44 present between the patch 60 and the detail 40. The central opening 62 allows the base 48 of the detail 40 to still directly adjoin and contact the foil layer 34.

It should be noted that attachment subassemblies 30' and 30" can be used for original fabrication of the fire blanket assembly 28 (i.e., OEM applications), or in a repair context to allow for the repair and re-use of previously used (e.g., aircraft-run) fire blankets 28 with damage (e.g., the damage 31 shown in FIG. 2).

Figure 4:
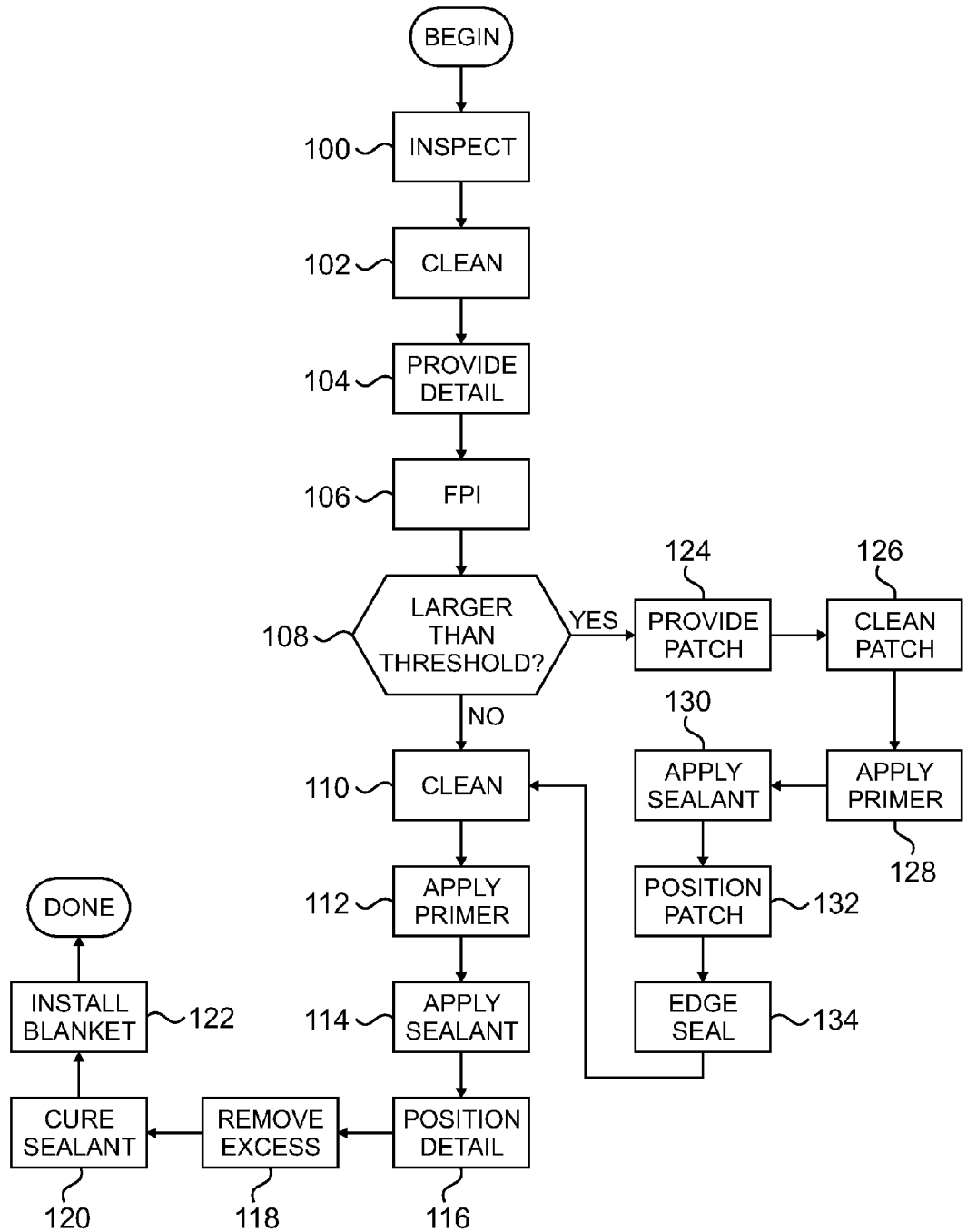
FIG. 4 is a flow chart of a method of installing an attachment subassembly according to the present invention.

FIG. 4 is a flow chart of a method of installing an attachment subassembly 30' or 30". Initially, a fire blanket assembly 28 can be inspected for damage, if any, and any existing attachment subassembly 30 can be removed (step 100). Next, the foil layer 32 can be pressed flat can cleaned with a suitable cleaner or solvent (e.g., alcohol on a lint-free cloth) (step 102). The detail 40 is provided (step 104), and fluorescent penetrant inspection (FPI) can be performed on the detail 40 to check for imperfections (step 106). If in the inspection at Step 100 there is damage, that damage is assessed to determine whether it is larger than a threshold, such as a length threshold (step 108). In one embodiment, the threshold is whether a length of an individual crack or tear in the foil layer 34 that is larger than 0.635 cm (0.25 inch).

If the damage is below the threshold at Step 108, a bond area on the foil layer 34 is cleaned (e.g., using the same cleaning process as for Step 102) (step 110). Next, a suitable primer is applied to surfaces of the detail 40, such as foil layer-facing surfaces of the sidewall 50 and the flange 52, and allowed to cure (step 112). A relatively thin layer of the sealant 44 can then be applied to mating, foil layer-facing surfaces of the detail 40, over the primer (step 114). Application of the sealant 44 at Step 114 can include first combining and mixing constituent materials or compounds of the sealant 44, such as a suitable additive curing agent combined with another compound. The detail 40 and the sealant 44 can then be positioned at the opening 38, arranged to cover damage that may be present in the foil layer 34, and force applied to press the detail 40 and the sealant 44 against the foil layer 34 in bonding areas (step 116). The sealant 44 can be kept away from the region between the base 48 of the detail 40 and the foil layer 34 within the opening 38 in the thermal insulation material 32. Then excess sealant 44 can be removed, while maintaining an edge seal about the edge 56 of the detail 40

(step 118). The sealant 44 is then cured (step 120). Thermal energy can optionally be added by heating the sealant 44 to facilitate curing at Step 120. When the sealant 44 is cured, the fire blanket assembly 28 can be installed in a desired location, such as on an aircraft structure 22 (step 122).

If the damage assessed at Step 108 is larger than the threshold, the foil patch 60 can be provided, such as by cutting or otherwise creating a patch of a desired shape and size from foil material (step 124). The patch 60 can then be cleaned, using methods similar to cleaning methods described above (step 126). A suitable primer can then be applied to a mating face of the patch 60 and of the foil layer 34, and cured (step 128). The sealant 44 is then applied to fill any damaged areas where the foil layer 34 has disbonded from the thermal insulation material 32, and applied to a foil layer-facing side of the patch 60 (step 130). The sealant 44 should generally not be applied at a bottom of the opening 38. The patch 60 is then positioned relative to the opening 38 and a force applied (step 132). Excess sealant 44 can be squeezed out during this step. Additional amounts of the sealant 44 can then be applied as needed and desired to form an edge seal about the perimeter edge of the patch 60 (134). The method can then proceed to Step 110 and proceed in the manner described above.

It should be noted that various steps of the method described above can be performed in a different order than that described, and certain steps can be performed simultaneously. In addition, it should be noted that the present method can be performed in conjunction with other steps or processes not specifically described. For instance, the present method can be performed in conjunction with a variety of known repair processes.

Any relative terms or terms of degree used herein, such as "substantially", "approximately", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental impurities in material compositions, and the like.

While the invention is described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, the particular shapes and sizes of components of the present invention can vary as desired for particular applications, and materials of the various components can also vary as desired for particular applications.

The invention claimed is:

1. A fire blanket assembly comprising:
    a thermal insulation material, wherein the thermal insulation material defines an opening;
    a metallic foil layer positioned along a first surface of the thermal insulation material and over at least a portion of the opening;
    an insert disc positioned adjacent to a second surface of the thermal insulation material opposite the first surface, the insert disc further being positioned at the opening in the thermal insulation material; and
    a detail including:
        a base positioned at least partially within the opening in the thermal insulation material;
        a sidewall extending from the base; and
        a flange extending from the sidewall at a location spaced from the base, a perimeter of the flange turned at least partially away from the metallic foil layer.

2. The assembly of claim 1 and further comprising:
    a hole defined through the metallic foil layer, the insert disc and the base of the detail, the hole aligned with the opening in the thermal insulation material.

3. The assembly of claim 1 and further comprising:
    a metallic foil patch positioned along a portion of the metallic foil layer and extending at least partially into the opening in the thermal insulation material.

4. The assembly of claim 3 and further comprising:
    a sealant located along the metallic foil patch adjacent to the metallic foil, wherein the sealant provides an edge seal along a perimeter of the metallic foil patch.

5. The assembly of claim 1, wherein the sidewall is substantially cylindrical.

6. The assembly of claim 1, wherein the sidewall is positioned at a perimeter of the base.

7. The assembly of claim 1, wherein the flange is positioned at an opposite end of the sidewall from the base.

8. The assembly of claim 1, wherein a perimeter portion of the flange has a toroidal shape.

9. The assembly of claim 1, wherein the flange has a substantially annular shape.

10. The assembly of claim 1, wherein the base is substantially planar.

11. The assembly of claim 1 and further comprising:
    a sealant located along the sidewall and the flange of the detail adjacent to the metallic foil, wherein the sealant comprises a material that provides fire bypass under charred conditions.

12. The assembly of claim 11 and further comprising:
    a metallic foil patch positioned along a portion of the metallic foil layer and extending at least partially into the opening in the thermal insulation material, wherein the sealant contacts the metallic foil patch.

13. The assembly of claim 11, wherein the sealant comprises an addition curable silicone material.

14. The assembly of claim 11, wherein the base rests directly against the metallic foil layer along the opening in the thermal insulation material without sealant therebetween.

15. The assembly of claim 1, wherein a material of the metallic foil layer is substantially identical to a material of the detail.

16. The assembly of claim 1, wherein the metallic foil layer comprises at least one textured surface.

17. A method for installing a fire blanket assembly:
    providing a subassembly comprising thermal insulation and a foil layer upon the thermal insulation, wherein the subassembly defines an opening in the thermal insulation;
    providing a rigid detail having a base, a sidewall extending from the base, and a flange extending from the sidewall at a location spaced from the base;
    mixing constituent materials of a sealant;
    applying the sealant to only the flange and the sidewall of the detail;
    positioning the detail and the sealant against the foil layer at the opening in the thermal insulation such that the base of the detail rests directly against the foil layer within the opening in the thermal insulation; and curing the sealant.

18. The method of claim 17 and further comprising:

cleaning at least a portion of at least one of the foil layer;

conducting fluorescent penetrant inspection on the detail prior to application of the sealant; and applying a primer to the detail prior to applying the sealant.

19. The method of claim 17 and further comprising:

inspecting the foil layer prior to positioning the detail and the sealant;

determining if a damaged portion of the foil layer at or near the opening in the thermal insulation exceeds a length threshold; and if the damaged portion the foil layer does exceed the length threshold, applying a foil patch to the foil layer at or near the opening in the thermal insulation with sealant, wherein the detail is then positioned over portions of the foil patch.

20. A fire blanket assembly comprising:

a thermal insulation material, wherein the thermal insulation material defines an opening;

a metallic foil layer positioned along a first surface of the thermal insulation material and over at least a portion of the opening;

a detail including:
- a substantially planar base positioned at least partially within the opening in the thermal insulation material directly adjacent to a portion of the metallic foil layer;
- a substantially cylindrical sidewall extending from a perimeter of the base;
- a substantially annular flange extending from the sidewall opposite the base, a perimeter portion of the flange being toroidal in shape with a perimeter edge turned at least partially away from the metallic foil layer;

an addition curable sealant located along the sidewall and the flange of the detail adjacent to the metallic foil, wherein the sealant comprises a material that provides fire bypass under charred conditions; and a fastener extending through a hole defined through the metallic foil layer and the detail.

* * * * *